United States Patent [19]

DiGiovanni et al.

[11] Patent Number: 5,708,669
[45] Date of Patent: Jan. 13, 1998

[54] ARTICLE COMPRISING A CLADDING-PUMPED OPTICAL FIBER LASER

[75] Inventors: David John DiGiovanni, Montclair; Ashish Madhukar Vengsarkar, Berkeley Heights, both of N.J.

[73] Assignee: Lucent Technologies Inc., Murray Hill, N.J.

[21] Appl. No.: 719,278

[22] Filed: Sep. 24, 1996

[51] Int. Cl.⁶ .................................................. H01S 3/07
[52] U.S. Cl. .............................. 372/6; 372/68; 385/142
[58] Field of Search ............... 372/6, 68; 385/123–127, 385/141, 142

[56] References Cited

U.S. PATENT DOCUMENTS

| | | | |
|---|---|---|---|
| 4,829,529 | 5/1989 | Kafka | 372/6 |
| 4,923,279 | 5/1990 | Ainslie et al. | 385/127 |
| 5,121,460 | 6/1992 | Tumminelli et al. | 385/126 |
| 5,309,452 | 5/1994 | Ohishi et al. | 372/6 |
| 5,473,622 | 12/1995 | Grubb | 372/6 |
| 5,491,581 | 2/1996 | Roba | 372/6 X |
| 5,530,709 | 6/1996 | Waarts et al. | 372/6 |

OTHER PUBLICATIONS

"High Power Neodymium–Doped Single Transverse Mode Fibre Laser", by H. Po et al., *Electronics Letters*, 19th Aug. 1993, vol. 29, No. 17, pp. 1500–1501.

"A Novel Design for a High Brightness Diode Pumped Fiber Laser Source", by P. Glas et al., *Optics Communications*, vol. 122, Jan. 1, 1996, pp. 163–168.

"Calculation of Modes in an Optical Fiber Using the Finite Element Method and EISPACK", by T. A. Lenahan, *The Bell System Technical Journal*, vol. 62, No. 9, Part 1, Nov. 1983, pp. 2663–2694.

*Primary Examiner*—John D. Lee
*Attorney, Agent, or Firm*—Eugen E. Pacher

[57] ABSTRACT

A cladding pumped optical fiber laser comprises a length of optical fiber having a rare earth-doped region of diameter $d_{RE} > d_{01}$ where $d_{01}$ is the mode diameter of the $LP_{01}$ mode of the fiber at the laser radiation at wavelength $\lambda$. In one embodiment the fiber has a core diameter $d_c$ selected such that the $LP_{01}$ mode is the only guided spatial mode of the fiber, and $d_{RE}$ is greater than $d_c$. In another embodiment the fiber supports at least one higher order guided spatial mode, typically $LP_{11}$ or $LP_{02}$, and $d_{RE}$ is approximately equal to or larger than $d_c$. Currently preferred embodiments comprise a grating-defined laser cavity that comprises a mode-coupling refractive index grating. Cladding pumped lasers according to the invention will typically have efficient conversion of pump radiation to laser radiation, and consequently can typically be shorter than analogous prior art cladding pumped lasers.

13 Claims, 2 Drawing Sheets

ARTICLE COMPRISING A CLADDING-PUMPED OPTICAL FIBER LASER

RELATED APPLICATION

This application is related to co-pending co-assigned application Ser. No. 08/712,694, filed Sep. 12, 1996 by T. A. Strasser, titled "Mode Coupling Optical Waveguide Grating", which is incorporated herein by reference.

FIELD OF THE INVENTION

This invention pertains to articles and systems (collectively "articles") comprising a cladding pumped optical fiber laser.

BACKGROUND

Cladding pumped fiber lasers (CPFLs) are known. See, for instance, H. Po et al., *Electronics Letters*, Vol. 29 (17), p. 1500, Aug. 19, 1993. See also P. Glas et al., *Optics Communications*, Vol. 122, p. 163, Jan. 1, 1996, and U.S. Pat. No. 5,121,460. It is expected that such lasers will be used to generate high optical power (e.g., 10 W) which will, for instance, be used to pump fiber amplifiers or lasers.

In a CPFL, optical power from large area laser diodes is converted to single mode laser radiation in the rare earth (e.g., Nd, Yb) - doped core of a cladding pumped fiber. In order to facilitate coupling of high pump power into the CPFL, it is typically necessary to use fiber with relatively large cladding diameter, exemplarily more than 250 μm. On the other hand, the conventional requirement of single mode output of the CPFL limits the core diameter of the CPFL to less than about 8 μm. This disparity in area between cladding cross section and core cross section necessitates long device length, exemplarily up to 200 m, since absorption of pump radiation in the CPFL structure is proportional to the ratio of core-to-clad cross section area. Furthermore, in conventional CPFL structures the optical power density in the fiber core can be high, in anticipated high power CPFLs possibly high enough to cause material damage.

It clearly would be desirable to have available CPFLs that are not subject to these and other shortcomings. This application discloses such CPFLs.

SUMMARY OF THE INVENTION

In a broad aspect the invention is embodied in an article (e.g., an optical fiber amplifier, or a communication system that comprises such an amplifier) that comprises an improved CPFL, e.g., a CPFL that is shorter than an analogous prior art CPFL, (e.g., less than 100 m long) and/or that is capable of higher power operation than an analogous prior art CPFL.

More specifically, the CPFL comprises a length of optical fiber having a (essentially circularly symmetric) core of relatively large refractive index contactingly surrounded by a cladding of relatively low refractive index. The core has a diameter $d_c$ selected such that the fiber supports a guided fundamental spatial mode $LP_{01}$ of laser radiation of wavelength $\lambda$. The $LP_{01}$ mode of the laser radiation has mode diameter $d_{01}$. The core comprises a rare earth dopant (e.g., Nd or Yb) selected to emit said laser radiation of wavelength $\lambda$. The article further comprises means for introducing pump radiation of wavelength $\lambda_p$ (typically $\lambda_p<\lambda$) into the optical fiber.

Significantly, the rare earth dopant is distributed throughout a portion of the fiber that comprises the core and has a diameter $d_{RE}>d_{01}$.

In one exemplary embodiment of the invention, $d_c$ is selected such that the $LP_{01}$ mode is the only guided spatial mode of the laser radiation, and the rare earth dopant is distributed throughout the core and a first cladding region that is adjacent to the core.

In another exemplary embodiment, $d_c$ is selected such that the fiber supports in addition to $LP_{01}$ at least one higher order guided mode (typically, $LP_{11}$ but not excluding $LP_{02}$) of the laser radiation, and $d_{RE}$ is larger than or approximately equal to $d_c$.

The diameter of the $LP_{01}$ mode ($d_{01}$) is defined to be the diameter of the fiber cross sectional region that contains 70% of the total $LP_{01}$ power at $\lambda$. The shape of the $LP_{01}$ mode, and therefore also the value of $d_{01}$, can be readily determined, e.g., by means of numerical computation as described in T. Lenahan, *Bell System Technical Journal*, Vol. 62, p. 2663 (1983). For a representation of various modes, see, for instance, the above-cited '460 patent.

The diameter of the rare earth dopant distribution ($d_{RE}$) is defined to be the diameter of fiber cross sectional region that contains 90% of the total amount of the relevant rare earth dopant in the fiber.

DETAILED DESCRIPTION OF EXEMPLARY EMBODIMENTS

Figure 1:
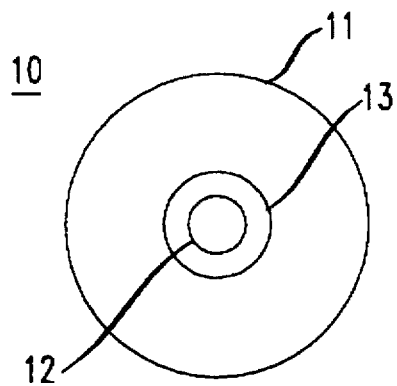
FIG. 1 schematically shows the cross section of the fiber of an exemplary CPFL according to the invention.
Figure 2:
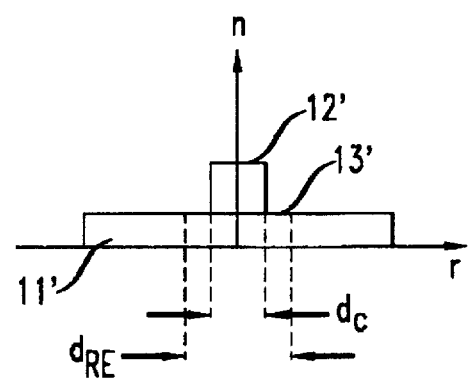
FIGS. 2 and 3 schematically show the respective respective refractive index profiles of the fiber of FIG. 1 and of the fiber of an other exemplary CPFL according to the invention.

FIG. 1 schematically shows a cross sectional view of an exemplary optical fiber 10 for a CPFL, wherein numerals 11–13 refer, respectively, to the outer (second) cladding region, the core, and the inner (first) cladding region. FIG. 2 schematically shows the refractive index (n) of exemplary fiber 10 as a function of radius r, wherein numeral 12' refers to the core index, and numerals 11' and 13' refer to the refractive index of the second and first cladding regions, respectively. Exemplarily, but not necessarily, the rare earth dopant (e.g., Nd) concentration is substantially constant throughout core 12 and first cladding region 13, with core 12 furthermore containing conventional index-raising dopant (s) (e.g., Ge). The core diameter $d_c$ typically is at most about 8 μm, the diameter and refractive index selected such that the fiber is a single mode fiber at a (laser) wavelength $\lambda$, that is to say, the fiber has only one guided mode at wavelength $\lambda$, namely, the fundamental spatial mode $LP_{01}$. Associated with any given fiber design is an effective mode diameter $d_{01}$. In the exemplary embodiment of the invention of FIGS. 1 and 2, the outer diameter $d_{RE}$ of the first cladding region is preferably selected such that $d_{RE}>1.1\,d_{01}$ For smaller $d_{RE}$ the advantages (e.g., increased coupling of pump radiation into the fiber core) of fiber according to this embodiment frequently become relatively small. For instance, for $d_{RE}=1.1\,d_{01}$ the attainable length reduction of the CPFL will be less than about 20% of the length of a corresponding prior art CPFL.

In a further embodiment of the invention, the core diameter and refractive index are selected such that the fiber has at least two guided spatial modes at $\lambda$, exemplarily typically $LP_{01}$ and $LP_{11}$. The core diameter of a multi-mode (e.g., dual mode) fiber will typically be significantly larger than the core of a corresponding single mode fiber, facilitating coupling of pump radiation from the cladding into the rare earth doped core.

Figure 3:
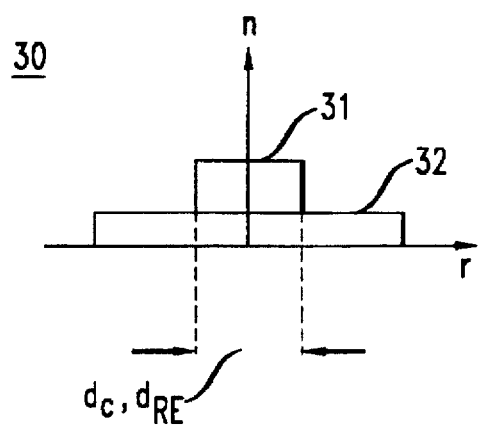

FIG. 3 schematically shows the refractive index profile of a dual mode fiber 30, with numeral 31 referring to the (typically Ge-doped) core, and 32 to the cladding. Exemplarily, the core diameter is substantially equal to the diameter of the rare earth distribution, but the latter could be greater than the former.

Figure 4:
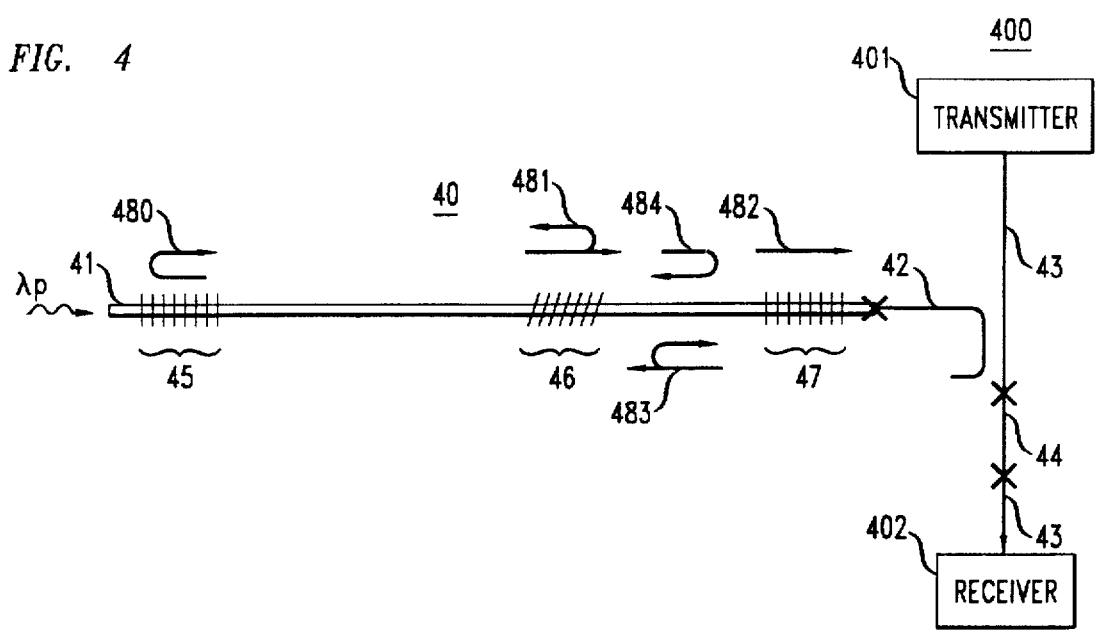
FIG. 4 schematically shows a relevant portion of an exemplary optical fiber communication system, the portion comprising a CPFL according to the invention.

FIG. 4 schematically depicts a relevant portion of an optical fiber communication system with a fiber amplifier and a cladding pumped optical fiber laser 40 according to the invention.

Pump radiation of wavelength $\lambda_p$ is introduced into the cladding of dual mode optical fiber 41 in conventional fashion. The fiber core is doped with an appropriate rare earth dopant, e.g., Nd or Yb, with exemparily $d_{RE} \sim d_c$. The pump radiation couples to the core and is absorbed by the rare earth dopant ions, resulting in emission of laser radiation of wavelength $\lambda$, with at least a portion of the emitted radiation propagating in the core in the $LP_{01}$ and $LP_{11}$ modes.

Dual mode fiber 41 contains refractive index gratings 45, 46 and 47, preferably including a mode coupling grating of the type described in detail in the above referenced co-pending patent application by T. A. Strasser. It will be understood that the gratings are present essentially only in the core of the fiber, and have essentially no effect on the pump radiation in the cladding.

Grating 45 is a high reflectivity (essentially 100% reflectivity) mode coupling grating (MCG). Such a grating is selected to reflect incident $LP_{01}$ radiation of wavelength $\lambda$ as $LP_{11}$ radiation of wavelength $\lambda$, and vice versa. Grating 46 is a medium reflectivity (e.g., ~98% reflection, ~2% transmission) MCG selected to transmit a fraction x of incident $LP_{01}$ radiation of wavelength $\lambda$ as $LP_{01}$ and reflect a fraction (1-x) as $LP_{11}$, and transmit a fraction x' (not necessarily equal to x) of incident $LP_{11}$ radiation as $LP_{11}$ and reflect (1-x') as $LP_{01}$. Finally, grating 47 is a high (essentially 100%) reflectivity grating that reflects essentially 100% of incident $LP_{11}$ radiation of wavelength $\lambda$ as $LP_{11}$, and transmits essentially all incident $LP_{01}$ radiation of wavelength $\lambda$ as $LP_{01}$. The laser could be designed to utilize $LP_{02}$ instead of $LP_{11}$.

Gratings that have the above recited properties are known, and can be made by a method disclosed in the above referenced application by T. A. Strasser.

When studying the operation of pump laser 40 it must be kept in mind that the gratings 45-47 are reciprocal elements, i.e., the gratings provide the same function for upstream radiation as for downstream radiation.

The operation of laser 40 can be readily analyzed. By way of example, consider the behavior of upstream propagating $LP_{11}$ radiation of wavelength $\lambda$. The radiation is reflected at grating 45 as $LP_{01}$, propagates to grating 46 where a fraction (1-x) is reflected as $LP_{11}$ and a fraction x is transmitted as $LP_{01}$, passes unchanged through grating 47 and is available for utilization. The reflected fraction (1-x) propagates to grating 45, is reflected as $LP_{01}$ that propagates to grating 46, where a fraction x is transmitted as $LP_{01}$ and a fraction (1-x) is reflected as $LP_{11}$. The transmitted fraction x passes through grating 47 and is available for utilization. Employing analogous reasoning for other components of the radiative in the laser cavity, the operation of the inventive laser can be readily elucidated.

In FIG. 4, symbols 480-484 are included to signify the function performed by the associated grating. For instance, symbol 481 signifies that grating 46 transmits a portion (e.g., 2%) of incident radiation unchanged and changes the mode of the reflected portion. Symbols 482 and 484 signify unchanged transmission of incident $LP_{01}$ and unchanged reflection of incident $LP_{11}$.

In FIG. 4, $LP_{01}$ radiation of wavelength $\lambda$ that has passed through grating 47 propagates to conventional fiber coupler (WDM) 42 and is coupled into single mode transmission fiber 43, where it propagates to conventional rare earth doped amplifier fiber 44, where it serves as pump radiation in conventional fashion.

Those skilled in the art will appreciate that the embodiment of FIG. 4 is not the only possible pump laser configuration according to the invention. For instance, a laser can be provided that has two long period (transmissive) mode converter gratings within the laser cavity.

Figure 5:
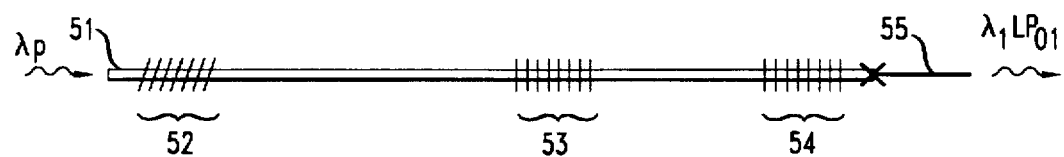
FIGS. 5 and 6 schematically show further exemplary embodiments of the invention.
Figure 6:
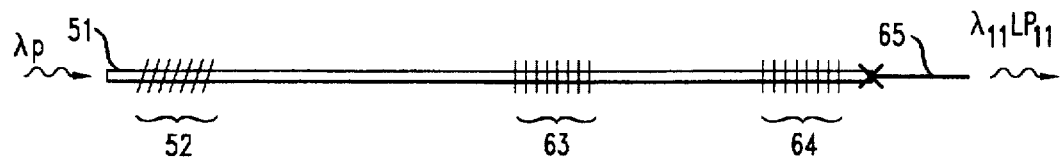

FIGS. 5 and 6 schematically depict further exemplary embodiments of the invention.

In FIG. 5, pump radiation $\lambda_p$ is coupled into the cladding of dual mode fiber 51, and is coupled into the rare earth doped core of the fiber. Grating 52 is a MCG that converts and reflects essentially 100% of incident laser radiation (wavelength $\lambda$), the conversion being from $LP_{01}$ to $LP_{11}$, or from $LP_{11}$ to $LP_{01}$, as the case may be. Grating 53 is selected to reflect essentially 100% of incident $LP_{11}$ radiation and to transmit essentially 100% of incident $LP_{01}$, both without mode conversion, and grating 54 is selected to transmit a preselected portion (e.g., 10%) of incident $LP_{01}$ radiation and to reflect the remainder, both without mode conversion. The $LP_{01}$ laser radiation transmitted through grating 54 is available for utilization, e.g., is guided in single mode fiber 55 to a fiber amplifier (not shown).

The embodiment of FIG. 6 resembles that of FIG. 5, but gratings 63 and 64, and fiber 65, differ from the corresponding elements of FIG. 5. Grating 63 is selected to reflect essentially 100% of incident $LP_{01}$ radiation of wavelength $\lambda$ and transmit essentially 100% of incident $LP_{11}$ radiation of that wavelength, both without mode conversion. Grating 64 is selected to transmit about 10% of incident $LP_{11}$ radiation of wavelength $\lambda$, and to reflect the remainder, both without mode conversion. Fiber 65 is a dual mode fiber adapted for guiding $LP_{01}$ and $LP_{11}$ radiation of wavelength $\lambda$. The embodiments of FIGS. 5 and 6 could be designed to use $LP_{02}$ instead of $LP_{11}$.

In a further exemplary embodiment of the invention, the lasers of FIGS. 5 and 6 are operated in parallel fashion, and the outputs combined.

It will be appreciated that the combination of FIG. 4 will generally be a part of an optical fiber communication system 400 that further comprises such conventional elements as a transmitter 401 and a receiver 402, and an optical fiber transmission path connecting transmitter and receiver. The embodiments of FIGS. 5 and 6 can be part of similar systems.

The invention claimed is:

1. An article comprising a first cladding pumped fiber laser comprising a length of optical fiber having an essentially circularly symmetric core of relatively large refractive index contactingly surrounded by a cladding of relatively low refractive index, said core having a diameter $d_c$ selected such that said optical fiber supports a fundamental guided spatial mode $LP_{01}$ of laser radiation of wavelength $\lambda$, said $LP_{01}$ mode having an effective mode diameter $d_{01}$, said core comprising a rare earth dopant selected to emit said laser radiation in said optical fiber;

CHARACTERIZED IN THAT said rare earth dopant is distributed throughout a portion of the optical fiber that comprises said core, said portion having a diameter $d_{RE} > d_{01}$.

2. Article according to claim 1, wherein $d_c$ is selected such that the $LP_{01}$ mode is the only guided mode supported by the optical fiber, and wherein $d_{RE} > d_c$.

3. Article according to claim 1, wherein $d_c$ is selected such that the optical fiber supports at least one higher order guided spatial mode of the radiation of wavelength $\lambda$, wherein $d_{RE}$ is approximately equal to or larger than $d_c$.

4. Article according to claim 3, wherein said optical fiber comprises refractive index gratings that define a laser cavity, with the laser cavity comprising at least one mode-coupling refractive index grating.

5. Article according to claim 4, wherein the at least one mode-coupling refractive index grating is disposed within said laser cavity.

6. Article according to claim 5, wherein the mode-coupling refractive index grating is selected to transmit a fraction x of incident $LP_{01}$ radiation of wavelength $\lambda$ as $LP_{01}$ radiation, and to reflect a fraction substantially equal to (1−x) of said incident $LP_{01}$ radiation as higher order mode radiation of wavelength $\lambda$.

7. Article according to claim 4, wherein the at least one mode-coupling refractive index grating serves to define said laser cavity.

8. Article according to claim 7, wherein the at least one higher order guided spatial mode is $LP_{11}$ and wherein the at least one mode-coupling refractive index grating is selected to reflect essentially all $LP_{11}$ radiation of wavelength $\lambda$ incident on the grating as $LP_{01}$ radiation.

9. Article according to claim 7, wherein the at least one higher order guided spatial mode is $LP_{02}$, and wherein the at least one mode-coupling refractive index grating is selected to reflect essentially all $LP_{02}$ radiation of wavelength $\lambda$ incident on the grating as $LP_{01}$ radiation.

10. Article according to claim 1, wherein said length of optical fiber is less than 100 m.

11. Article according to claim 1, wherein the article is an optical fiber communication system comprising a transmitter, a receiver, and an optical fiber transmission path signal transmissively connecting said transmitter and receiver, wherein said first cladding pumped fiber laser is optically coupled to said optical fiber transmission path such that said laser radiation is available for utilization in the optical fiber transmission path.

12. Article according to claim 11, wherein said optical fiber transmission path comprises an optical fiber amplifier, and wherein said radiation serves as pump radiation in the optical fiber amplifier.

13. Article according to claim 11, the article further comprising a second cladding pumped fiber laser, and still further comprising means for combining the output radiation of the first and the second cladding pumped fiber lasers.

* * * * *